UNITED STATES PATENT OFFICE.

CHARLES DE LA HARPE AND RUDOLF BURCKHARDT, OF BASEL, SWITZERLAND, ASSIGNORS TO DYE-WORKS FORMERLY L. DURAND, HUGUENIN & CO., OF BASEL, SWITZERLAND.

LEUCO PRODUCTS FROM GALLIC COMPOUNDS AND ALKYL-DIAMIDO-ARYLTHIOSULFONIC ACIDS, &c.

No. 842,303.      Specification of Letters Patent.      Patented Jan. 29, 1907.

Application filed October 25, 1906. Serial No. 340,494.

*To all whom it may concern:*

Be it known that we, CHARLES DE LA HARPE and RUDOLF BURCKHARDT, chemists, citizens of the Swiss Republic, and residents of Basel, Switzerland, have invented new and useful Leuco Condensation Products from Gallic Compounds and Alkyl-Diamido-Arylthiosulfonic Acids and a Process for the Manufacture of the Same, of which the following is a clear, full, and exact specification.

We have found that new compounds very valuable for dyeing and printing are obtained when alkyl-diamido-arylthiosulfonic acids are caused to react with gallic compounds—as, for instance, gallamic acid, gallic acid, methyl gallate, or gallanilid in water, alcohol, or another suitable medium in presence of alkali and with exclusion of air. The condensation occurs gradually with elimination of sulfurous acid as a sulfite and with formation of a leuco compound which may easily be oxidized in air; but its hydrochlorid and other salts are not changed by air. These new leuco compounds constitute in dry state and in the form of salts greenish powders soluble in sulfuric acid with a red coloration, becoming violet-black on addition of an oxidizing agent, and yield by oxidation on chromium-mordanted fibers blue-violet shades fast to light and washing.

Example: Into an autoclave having a valve and a double bottom are introduced four hundred liters of water, eighteen kilos of gallamic acid, and twenty-five kilos of dimethylparaphenylendiaminthiosulfonic acid. The autoclave is now closed with the exception of the valve, and then is introduced a solution of caustic soda containing twenty kilos of NaOH while stirring well. The autoclave is then completely closed and the stirring continued, while the temperature is gradually raised to 45° centigrade. After 36-48 hours—that is to say, when the condensation is complete—the autoclave is allowed to cool, and its contents are allowed to flow into 60–70 kilos of hydrochloric acid of 21° Baumé specific gravity. On addition of common salt the condensation product separates in a greenish mass, which is filtered and dried. It is slightly soluble in water. On addition of sodium acetate to its aqueous solution a greenish-gray precipitate separates, while on addition of an alkali in presence of air the solution is immediately colored intensely red-violet. In concentrated sulfuric acid the condensation product dissolves to a red solution, which on addition of water becomes pale violet and on addition of a small quantity of an oxidizing agent violet-black. The condensation product can be fixed on textile fibers with aid of chromium mordants and then yields by oxidation on the fiber, whether by air or by an oxidant, such as potassium bichromate, blue-violet shades which are fast to light and washing. In this example there can be substituted for the water and dimethylparaphenylendiaminthiosulfonic acid a solution of the sodium salt of this acid, such as is obtained by the action of a chromate on dimethylparaphenylendiamin and a thiosulfate in presence of zinc chlorid and treating the product with a solution of sodium carbonate or caustic soda. Similar condensation products may be obtained by substituting for the gallamic acid in this example an equivalent quantity of gallic acid, methyl gallate, or gallanilid. Moreover, in the example there may be used twenty-eight kilos of diethylparaphenylendiaminthiosulfonic acid instead of twenty-five kilos of dimethylparaphenylendiaminthiosulfonic acid. Finally, for the twenty kilos of caustic soda of the example may be substituted thirty kilos of calcium hydroxid if the mixture be heated to 60° centigrade.

What we claim is—

1. The described process for the manufacture of new leuco compounds suitable for dyeing and printing, by reacting with an alkyl-diamido-arylthiosulfonic acid on a gallic compound, in presence of alkali with exclusion of air.

2. The described process for the manufacture of new leuco compounds suitable for dyeing and printing, by reacting with a dialkylparaphenylendiaminthiosulfonic acid on gallamic acid, in presence of alkali with exclusion of air.

3. As new products the described leuco compounds suitable for dyeing and printing, derived from an alkyl-diamido-arylthiosulfonic acid and a gallic compound, which constitute in the form of salts and in dry state greenish powders soluble in sulfuric acid with red coloration becoming violet-black on addition of an oxidizing agent and yield, by oxidation on chromium-mordanted fibers, blue-violet shades fast to light and washing.

4. As a new article of manufacture the described leuco compound suitable for dyeing and printing derived from a dialkylparaphenylendiaminthiosulfonic acid and gallamic acid, which constitutes in the form of its hydrochlorid and in dry state a greenish powder slightly soluble in water, yields by oxidation on chromium-mordanted fibers, blue-violet shades fast to light and washing, dissolves in sulfuric acid with red coloration becoming pale violet on addition of water or violet-black on addition of an oxidizing agent.

In witness whereof we have hereunto signed our names in the presence of two subscribing witnesses.

CHARLES DE LA HARPE.
RUDOLF BURCKHARDT.

Witnesses:
GEO. GIFFORD,
AMAND RITTER